United States Patent
Reynolds et al.

(10) Patent No.: US 10,718,214 B2
(45) Date of Patent: Jul. 21, 2020

(54) HIGH-PRESSURE COMPRESSOR ROTOR WITH LEADING EDGE HAVING INDENT SEGMENT

(71) Applicant: HONEYWELL INTERNATIONAL INC., Morris Plains, NJ (US)

(72) Inventors: Bruce David Reynolds, Chandler, AZ (US); Richard David Conner, Peoria, AZ (US); Costas Vogiatzis, Gilbert, AZ (US); Timothy Gentry, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 725 days.

(21) Appl. No.: 15/454,372

(22) Filed: Mar. 9, 2017

(65) Prior Publication Data
US 2018/0258770 A1  Sep. 13, 2018

(51) Int. Cl.
*F01D 5/14* (2006.01)
*F04D 29/32* (2006.01)
(Continued)

(52) U.S. Cl.
CPC .............. *F01D 5/141* (2013.01); *B23P 15/02* (2013.01); *F01D 5/147* (2013.01); *F04D 29/324* (2013.01);
(Continued)

(58) Field of Classification Search
CPC ... F01D 5/12; F01D 5/14; F01D 5/141; F01D 5/147; F01D 25/02; F04D 29/324;
(Continued)

(56) References Cited

U.S. PATENT DOCUMENTS 7,758,306 B2    7/2010  Burton et al.
2005/0271513 A1*  12/2005  Johann ................... F01D 5/141
                                                       416/236 R
(Continued)

FOREIGN PATENT DOCUMENTS

EP    1111188 A2    6/2001
EP    1557530 A2    7/2005
(Continued)

OTHER PUBLICATIONS

Vienna University of Technology, "Optimization of a Compound Lean Turbine Blade in a Linear Cascade," https://publik.tuwien.ac.at/files/PubDat_167302.pdf, Oct. 13, 2008.
(Continued)

*Primary Examiner* — Moshe Wilensky
*Assistant Examiner* — Elton K Wong
(74) *Attorney, Agent, or Firm* — Lorenz & Kopf, LLP (57) ABSTRACT

A rotor blade comprises a mount and a blade that extends from the mount along a radial axis. The leading edge includes an indent segment. The leading edge has a leading edge radial length measured along the radial axis. The indent segment has an indent radial length measured along the radial axis. The indent segment has an indent depth. A first ratio of the indent radial length to the leading edge radial length is at most 0.5. A second ratio of the indent depth to the indent radial length is at least 0.05.

15 Claims, 9 Drawing Sheets

(51) Int. Cl.
*F04D 29/38* (2006.01)
*B23P 15/02* (2006.01)

(52) U.S. Cl.
CPC ...... *F04D 29/384* (2013.01); *F05D 2240/303* (2013.01); *F05D 2240/304* (2013.01); *F05D 2240/307* (2013.01); *F05D 2250/712* (2013.01); *Y02T 50/673* (2013.01)

(58) Field of Classification Search
CPC ............. F04D 29/384; F05D 2240/303; F05D 2250/712; Y02T 50/673; B23P 15/02
USPC .................................................. 416/228, 238
See application file for complete search history.

(56) References Cited

U.S. PATENT DOCUMENTS

| | | | |
|---|---|---|---|
| 2008/0181769 A1* | 7/2008 | Wilson | F01D 5/141 415/181 |
| 2010/0215503 A1* | 8/2010 | Myoren | F01D 5/141 416/223 A |
| 2012/0171018 A1 | 7/2012 | Hasel et al. | |
| 2013/0323065 A1* | 12/2013 | Murooka | F01D 5/141 416/219 R |
| 2014/0356154 A1* | 12/2014 | Iliopoulou | F01D 5/141 415/208.1 |
| 2014/0377075 A1* | 12/2014 | Warikoo | F01D 5/14 416/223 R |
| 2015/0044028 A1 | 2/2015 | Lord et al. | |
| 2016/0003060 A1* | 1/2016 | Cook | F01D 5/28 416/224 |
| 2016/0230561 A1 | 8/2016 | Duong et al. | |

FOREIGN PATENT DOCUMENTS

| | | |
|---|---|---|
| EP | 1712738 A2 | 10/2006 |
| EP | 1921324 A1 | 5/2008 |
| EP | 1995469 A1 | 11/2008 |
| EP | 2022988 A1 | 2/2009 |
| EP | 2660475 A1 | 11/2013 |
| RU | 2606294 C1 | 1/2017 |

OTHER PUBLICATIONS

Extended EP Search Report for Application No. 18160364.8-1004 dated Jan. 8, 2018.

* cited by examiner

HIGH-PRESSURE COMPRESSOR ROTOR WITH LEADING EDGE HAVING INDENT SEGMENT

TECHNICAL FIELD

The present disclosure generally relates to compressors and, more particularly, relates to a high-pressure compressor rotor with a leading edge having an indent segment.

BACKGROUND

Compressors can be used in a variety of applications. For example, some compressors (e.g., axial compressors) may be part of a gas turbine engine. In many cases, compressors may include one or more rotors. The rotor may include a hub and a plurality of blades that project radially away from the hub.

The compressor may be exposed to foreign objects during operation. For example, ice or other debris may build up and then release into the fluid flow through the compressor. This material can impact one or more blades of the compressor. The blades need to be robust enough to withstand the impact.

Accordingly, it is desirable to provide an improved rotor blade for a compressor that is highly robust. Furthermore, other desirable features and characteristics of the present invention will become apparent from the subsequent detailed description and the appended claims, taken in conjunction with the accompanying drawings and the foregoing technical field and background.

SUMMARY

According to various embodiments, a rotor blade for a gas turbine engine is provided. The rotor blade is configured to be mounted to a support structure for rotation about an axis of rotation. The rotor blade comprises a mount configured to be attached to the support structure. The rotor blade also comprises a blade that extends from the mount along a radial axis. The blade includes a leading edge with a first point proximate the mount, a second point, and a third point disposed between the first point and the second point relative to the radial axis. The leading edge includes an indent segment that extends between the second point and the third point. The indent segment includes a nadir point. An imaginary leading edge profile extends continuously from the first point to the second point. The indent segment is indented from the imaginary leading edge profile in a transverse direction relative to the radial axis. The leading edge has a leading edge radial length measured along the radial axis from the first point to the second point. The indent segment has an indent radial length measured along the radial axis from the second point to the third point. The indent segment has an indent depth measured from the nadir point to the imaginary leading edge profile along the transverse direction. A first ratio of the indent radial length to the leading edge radial length is at most 0.5. A second ratio of the indent depth to the indent radial length is at least 0.05.

Additionally, a method of manufacturing a rotor blade for a gas turbine engine is disclosed, wherein the rotor blade is configured to be mounted to a support structure for rotation about an axis of rotation. The method comprises forming a mount configured to be attached to the support structure. The method also comprises forming a blade that extends from the mount along a radial axis. Forming the blade includes forming a leading edge with a first point proximate the mount, a second point, and a third point disposed between the first point and the second point relative to the radial axis. The leading edge includes an indent segment that extends between the second point and the third point. The indent segment includes a nadir point. An imaginary leading edge profile extends continuously from the first point to the second point. The indent segment is indented from the imaginary leading edge profile in a transverse direction relative to the radial axis. The leading edge has a leading edge radial length measured along the radial axis from the first point to the second point. The indent segment has an indent radial length measured along the radial axis from the second point to the third point. The indent segment has an indent depth measured from the nadir point to the imaginary leading edge profile along the transverse direction. A first ratio of the indent radial length to the leading edge radial length is at most 0.5. A second ratio of the indent depth to the indent radial length is at least 0.05.

Also provided according to various embodiments is a rotor for a compressor of a gas turbine engine. The rotor comprises a rotor disc configured to rotate about an axis of rotation. The rotor also includes a plurality of rotor blades that are attached to the rotor disc. At least one of the plurality of rotor blades includes a mount that is attached to the rotor disc and a blade that extends from the mount along a radial axis. The blade includes a leading edge, a trailing edge, and a blade tip that extends between the leading edge and the trailing edge. The blade includes a mean axis extending between the leading edge and the trailing edge. The leading edge includes a hub point proximate the mount, a tip point proximate the blade tip, and an intermediate point disposed between the hub point and the tip point relative to the radial axis. The leading edge includes an indent segment that extends between the tip point and the intermediate point. The indent segment includes a nadir point. An imaginary leading edge profile extends continuously from the hub point to the tip point. The indent segment is indented from the imaginary leading edge profile with respect to the mean axis. The leading edge has a leading edge radial length measured along the radial axis from the hub point to the tip point. The indent segment has an indent radial length measured along the radial axis from the tip point to the intermediate point. The indent segment has an indent depth measured from the nadir point to the imaginary leading edge profile along the mean axis. A first ratio of the indent radial length to the leading edge radial length is between approximately 0.20 and 0.45. A second ratio of the indent depth to the indent radial length is between approximately 0.1 and 0.2.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of compressor, and that the axial compressor described herein is merely one exemplary embodiment of the present disclosure. It should be noted that many alternative or additional functional relationships or physical connections may be present in an embodiment of the present disclosure.

Figure 1:
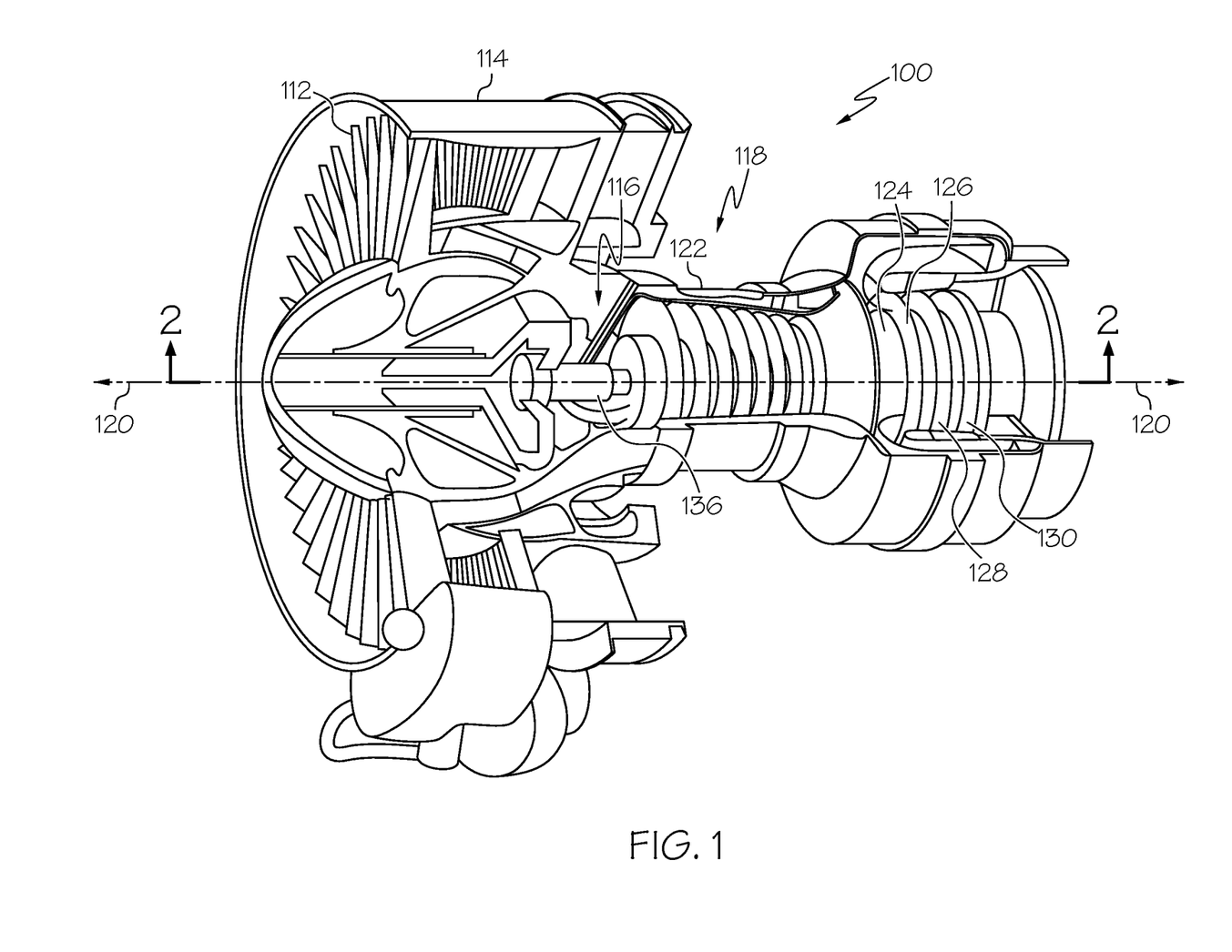
FIG. 1 is a schematic partially cut-away illustration of a gas turbine engine that includes an axial compressor with rotors that may be configured with blades of the present disclosure.
Figure 2:
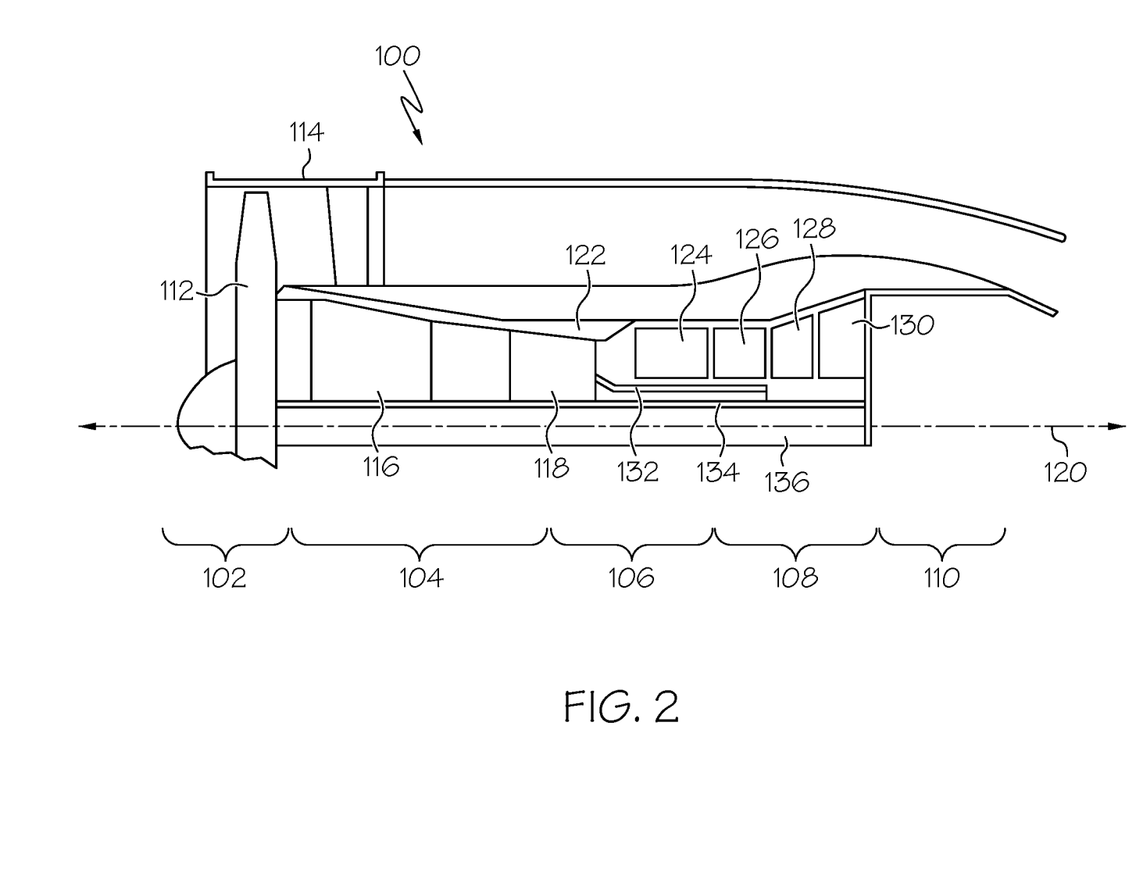
FIG. 2 is a schematic cross-sectional illustration of the gas turbine engine of FIG. 1, taken along line 2-2 of FIG. 1.

With reference to FIGS. 1 and 2, an exemplary gas turbine engine 100 is shown that is configured to include a rotor blade of the present disclosure. It should be noted that while the rotor blade of the present disclosure is discussed with regard to a gas turbine engine 100, the rotor blade of the present disclosure can be employed with any suitable engine, such as a turbojet engine, a scramjet engine, an auxiliary power unit (APU), etc. Thus, the following description is merely one exemplary use of the rotor blade of the present disclosure.

As shown in the example of FIG. 2, the exemplary gas turbine engine 100 may include a fan section 102, a compressor section 104, a combustion section 106, a turbine section 108, and an exhaust section 110. The fan, combustion, turbine, and exhaust sections 102, 106, 108, 110 can be substantially similar to those of a conventional gas turbine engine; therefore, the fan, combustion, turbine, and exhaust sections 102, 106, 108, 110 will not be discussed in detail herein. It should also be understood that FIGS. 1 and 2 are merely illustrative and may not be necessarily drawn to scale. In addition, while the fluid discussed herein is described as air, it should be noted that the various teachings of present disclosure is not so limited, but rather, any suitable fluid can be employed.

The fan section 102 includes a fan 112 mounted in a fan casing 114. The fan 112 induces air from the surrounding environment into the engine 100 and passes this air toward the compressor section 104.

The compressor section 104 includes at least one compressor and, in this example, includes a low-pressure (LP) compressor 116 (may also be referred to as an intermediate-pressure (IP) compressor, a booster or T-stage) and a high-pressure (HP) compressor 118. The LP compressor 116 raises the pressure of the air directed into it from the fan 112 and directs the compressed air into the HP compressor 118. The LP compressor 116 and the HP compressor 118 may be axi-symmetrical about a longitudinal centerline axis 120. The LP compressor 116 and the HP compressor 118 are mounted in a compressor casing 122 (i.e., shroud).

Still referring to FIG. 2, the combustion section 106 of the gas turbine engine 100 includes a combustor 124 in which the high-pressure air from the HP compressor 118 is mixed with fuel and combusted to generate a combustion mixture of air and fuel. The combustion mixture is then directed into the turbine section 108. The turbine section 108 includes a number of turbines disposed in axial flow series. FIG. 2 depicts a high-pressure turbine 126, an intermediate pressure turbine 128, and a low-pressure turbine 130. While three turbines are depicted, it is to be understood that any number of turbines may be included according to design specifics. For example, a propulsion gas turbine engine may comprise only a high-pressure turbine and a low-pressure turbine. The combustion mixture from the combustion section 106 expands through each turbine 126, 128, 130, causing them to rotate. As the turbines 126, 128, 130 rotate, each respectively drives equipment in the gas turbine engine 100 via concentrically disposed spools or shafts 132, 134, 136. The combustion mixture is then exhausted through the exhaust section 110.

Figure 3:
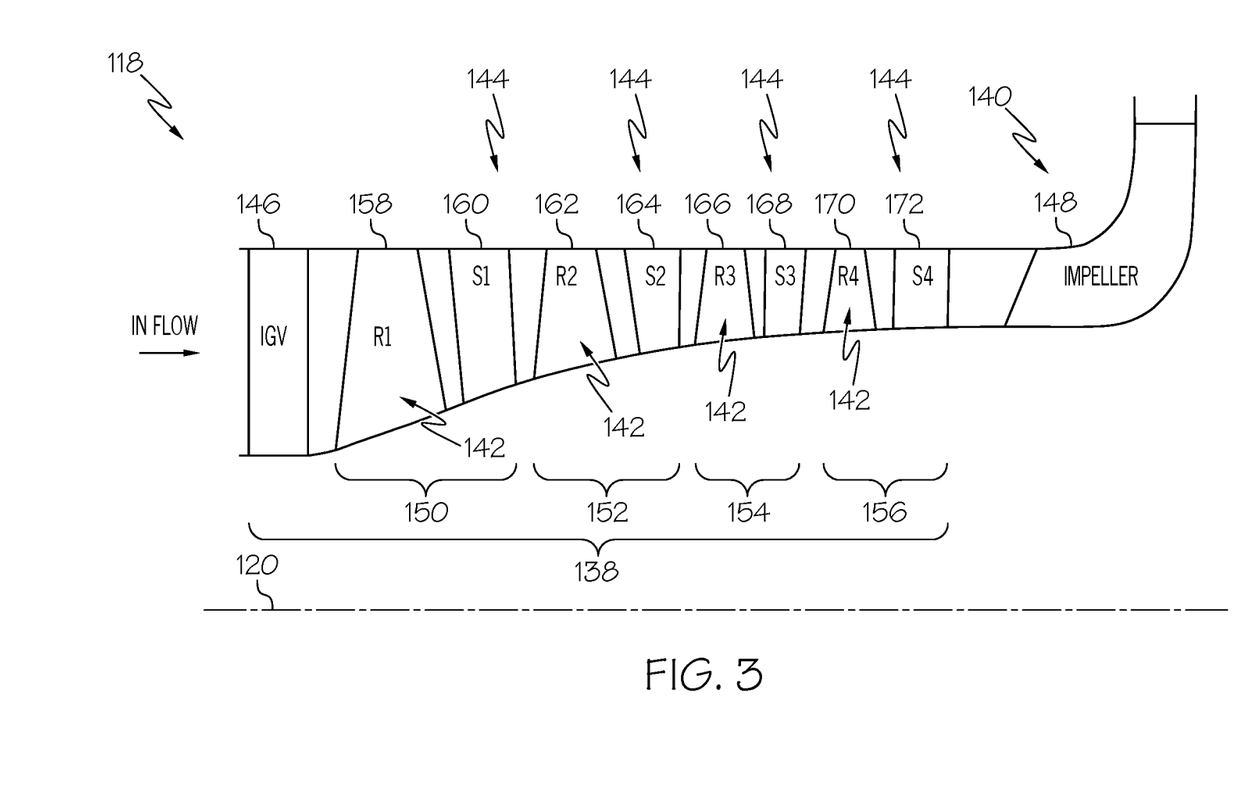
FIG. 3 is a schematic cross-sectional view through a portion of the axial compressor of FIG. 1.

With reference to FIG. 3, a schematic longitudinal sectional view through a portion of the HP compressor 118 is shown. In this example, the HP compressor 118 includes an axial compressor section 138 and a centrifugal compressor section 140. The axial compressor section 138 includes one or more rotors 142 and one or more stators 144. The one or more rotors 142 and the one or more stators 144 are enclosed by the compressor casing 122 (FIG. 2). The axial compressor section 138 may also include an inlet guide vane (IGV) 146. The centrifugal compressor section 140 can include an impeller 148 as shown. The IGV 146 and the impeller 148 may be conventional and may be generally known in the art; therefore, they will not be discussed in great detail herein.

With continued reference to FIG. 3, the axial compressor section 138 may include one or more compressor stages spaced in an axial direction along the longitudinal centerline axis 120, with the one or more rotors 142 and the one or more stators 144 cooperating to define a stage. In one example, the axial compressor section 138 comprises a four-stage axial compressor section 138, namely, a first stage 150, a second stage 152, a third stage 154, and a fourth stage 156. It should be noted, however, that the axial compressor section 138 may have any number of stages, and thus, it will be understood that the present teachings herein are not limited to an axial compressor section 138 having four stages.

In this example, the first stage 150 may include a rotor 158 and a stator 160. The rotor 158 may be disposed downstream of the IGV 146 and may be disposed between the IGV 146 and the stator 160. The second stage 152 may include a rotor 162 and a stator 164. The rotor 162 may be disposed downstream of the stator 160 and may be disposed between the stator 160 and the stator 164. The third stage 154 may include a rotor 166 and a stator 168. The rotor 166 may be disposed downstream of the stator 164 and may be disposed between the stator 164 and the stator 168. The fourth stage 156 may include a rotor 170 and a stator 172. The rotor 170 may be disposed downstream of the stator 168 and may be disposed between the stator 168 and the stator 172. Also, the stator 172 of the fourth stage 156 may be disposed upstream of the impeller 148 of the centrifugal compressor section 140.

In some embodiments, at least one rotor of the axial compressor section 138 may include one or more features that increase strength, robustness, stiffness, resistance to plastic deformation, and/or other related characteristics. These features may allow the rotor to withstand relatively high loads, for example, from ice or other debris that impacts the rotor. As an example, ice may build up on the IGV 146 (e.g., in freezing fog conditions), and actuation of the IGV 146 may dislodge the ice and allow it to flow toward and impact the rotor 158 of the first stage 150. Accordingly, the rotor 158 may include one or more features of the present disclosure that increase its strength, robustness, resistance to plastic deformation, etc. so that the rotor 158 withstands the impact. The following discussion will detail these features according to example embodiments of the present disclosure.

Figure 4:
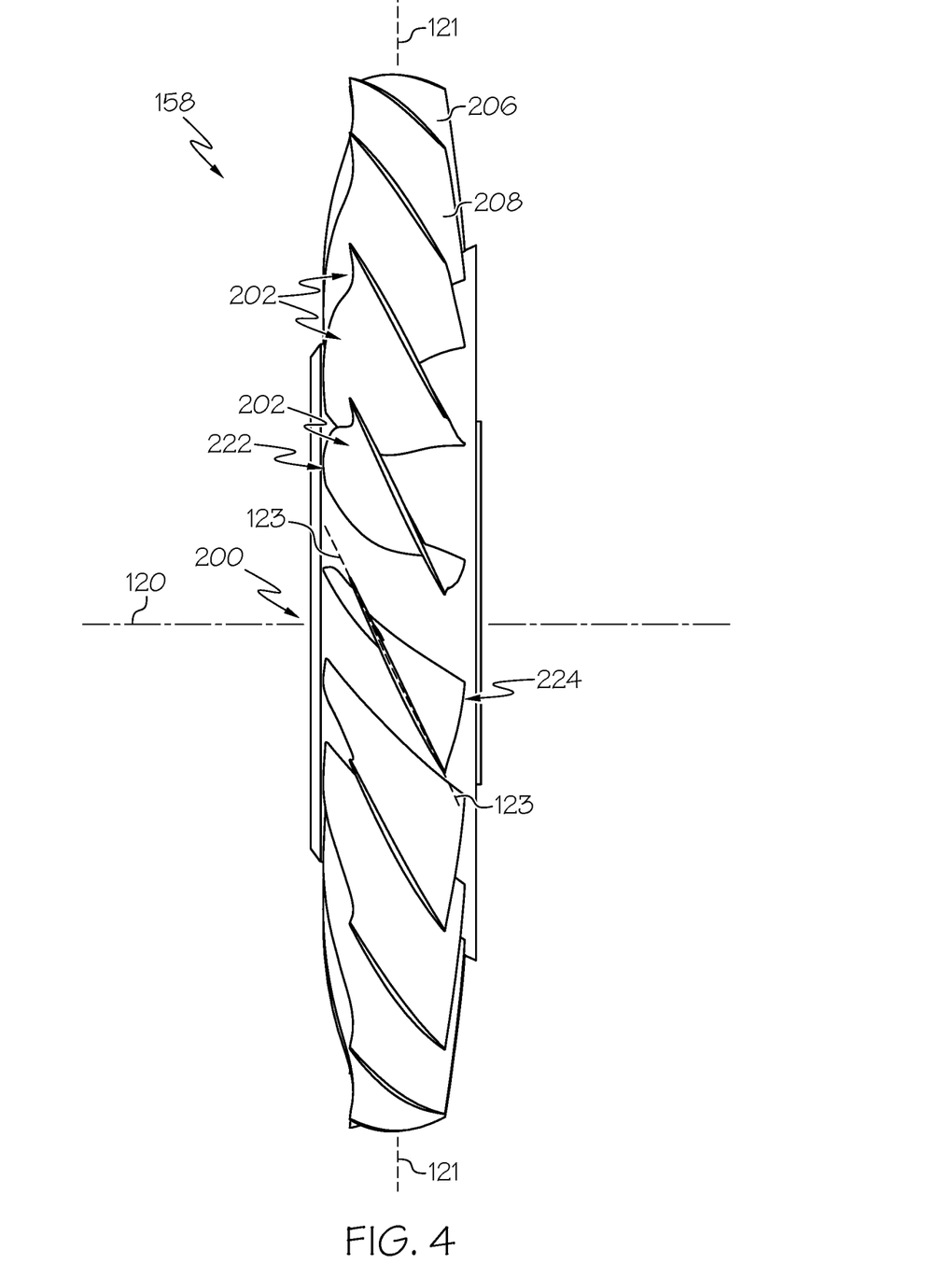
FIG. 4 is a side view of a rotor of the axial compressor of FIG. 1.
Figure 5:
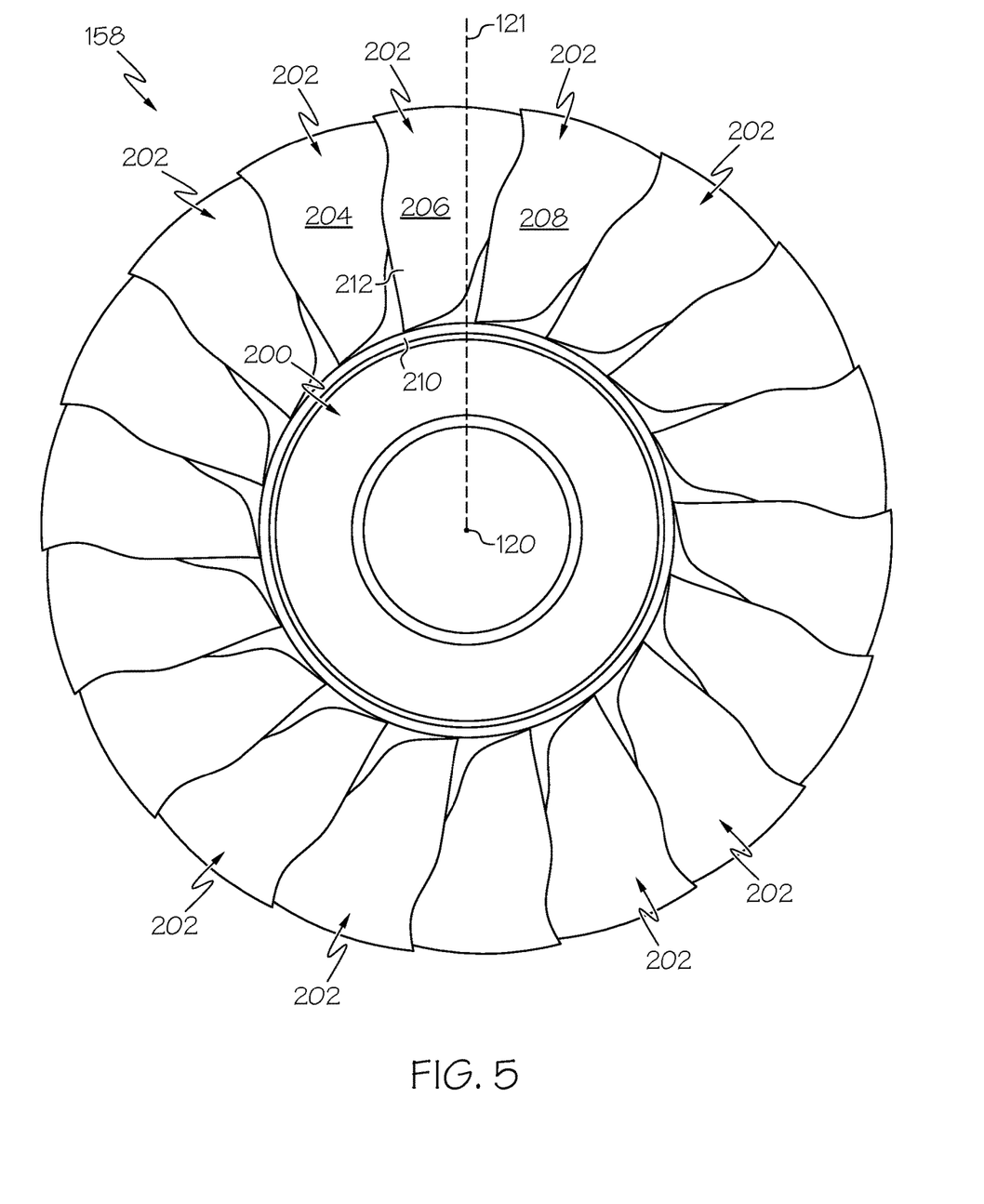
FIG. 5 is an end view of the rotor of FIG. 4 from a forward perspective looking aft.

The rotor 158 is shown in detail in FIGS. 4 and 5 according to an example embodiment. The longitudinal centerline axis 120 and a radial axis 121 are also included for reference purposes. Furthermore, a mean axis 123 (discussed in detail below) is included for reference purposes. Generally, the rotor 158 may include a rotor disc 200 (i.e., support structure) and a plurality of rotor blades 202.

The rotor disc 200 may be annular and may extend continuously about the longitudinal centerline axis 120. The rotor disc 200 may also be mounted (e.g., fixed) to one of the shafts 132, 134, 136 (FIG. 2) for rotation about the axis 120. The plurality of rotor blades 202 may be mounted (e.g., fixed) to the outer diameter of the rotor disc 200 and may project radially away from the axis 120. The rotor blades 202 may be spaced evenly about the rotor disc 200 in the circumferential direction about the axis 120.

As shown in FIG. 5, the plurality of rotor blades 202 may include a first rotor blade 204, a second rotor blade 206, and a third rotor blade 208. The second rotor blade 206 will be discussed in detail below. It will be appreciated that the first rotor blade 204, the third rotor blade 208 and/or the other rotor blades 202 of the rotor 158 may include similar features. In the embodiment of FIG. 5, each of the rotor blades 202 are substantially the same.

Figure 6:
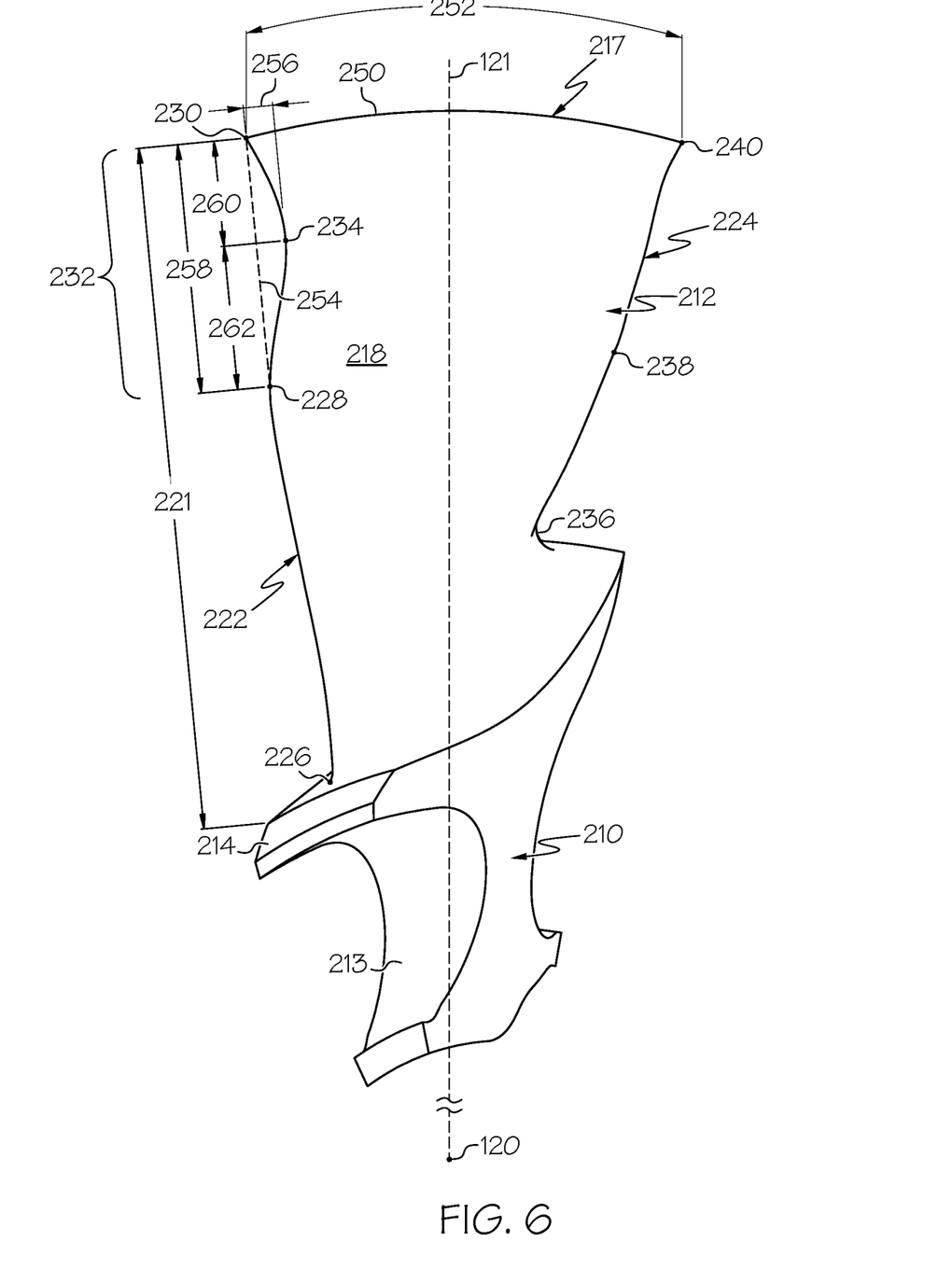
FIG. 6 is an end view of a single rotor blade of the rotor of FIGS. 4 and 5 from a forward perspective looking aft.

The rotor blade 206 is shown from various perspectives in FIGS. 6-9. The longitudinal centerline axis 120 and the radial axis 121 is shown in FIG. 6 for reference purposes. It will be appreciated that the rotor blade 206 may have alternate configurations or arrangements without departing from the scope of the present disclosure.

In some embodiments, the rotor blade 206 may be a unitary (one-piece) member that generally includes a mount 210 (i.e., hub) and a blade 212. The rotor blade 206 may be made from any suitable material, including high stress resistant aerospace alloys, such as titanium based alloys, nickel based alloys, single crystal materials, directionally solidified materials, or others.

The mount 210 may include a root 213 that is configured to couple the rotor blade 206 to the rotor disc 200 (i.e., the support structure). The mount 210 may also include a platform 214 that projects from the root 213. The platform 214 may be configured to form the main gaspath and to radially contain airflow within the compressor casing 122 (FIG. 2) during operation.

The blade 212 extends outwardly from the platform 214 along the radial axis 121 and may terminate at a blade tip 217. Thus, the blade 212 may have a radial length 221, which is measured along the radial axis 121 from the platform 214 to the blade tip 217.

Figure 7:
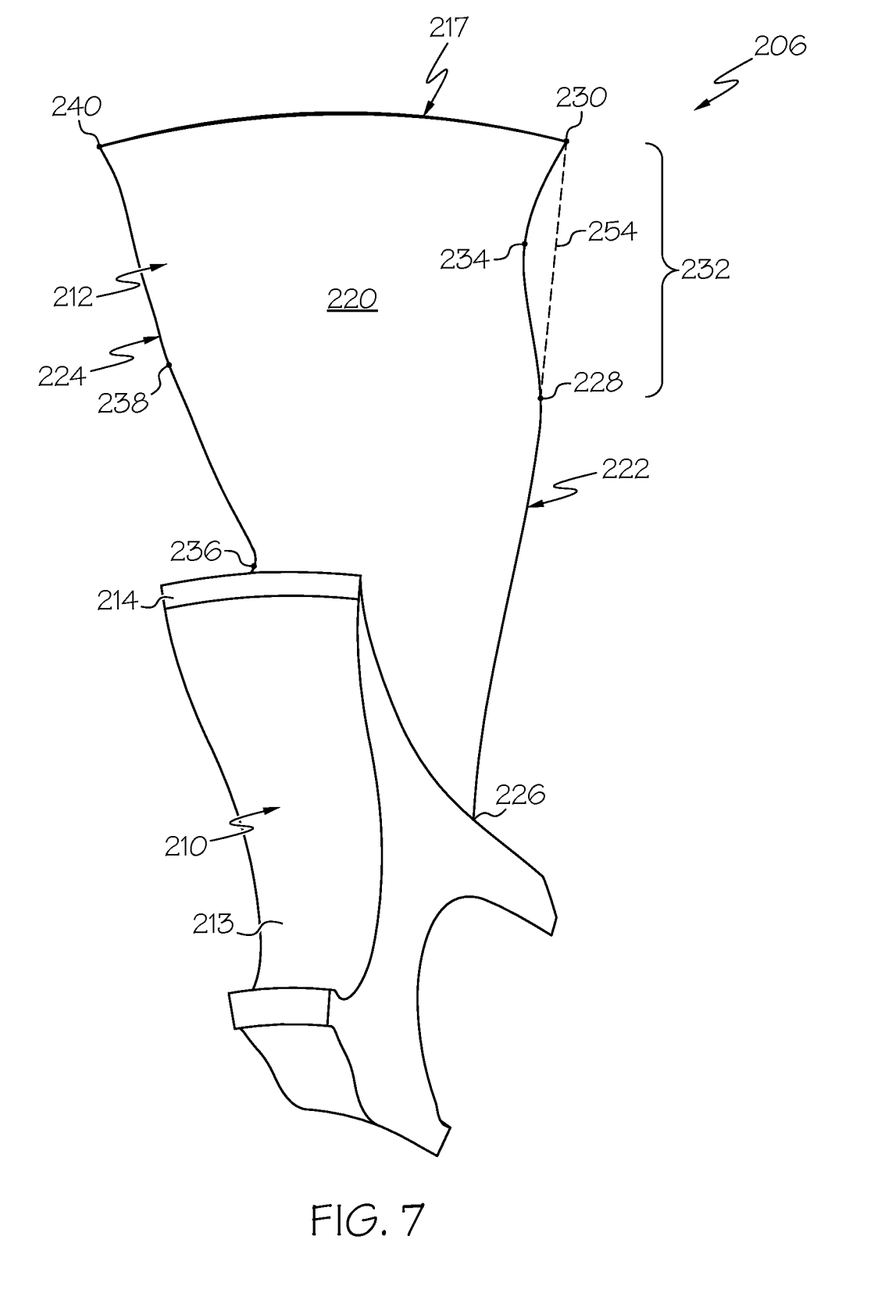
FIG. 7 is an end view of the rotor blade of FIG. 6 from an aft perspective looking forward.
Figure 8:
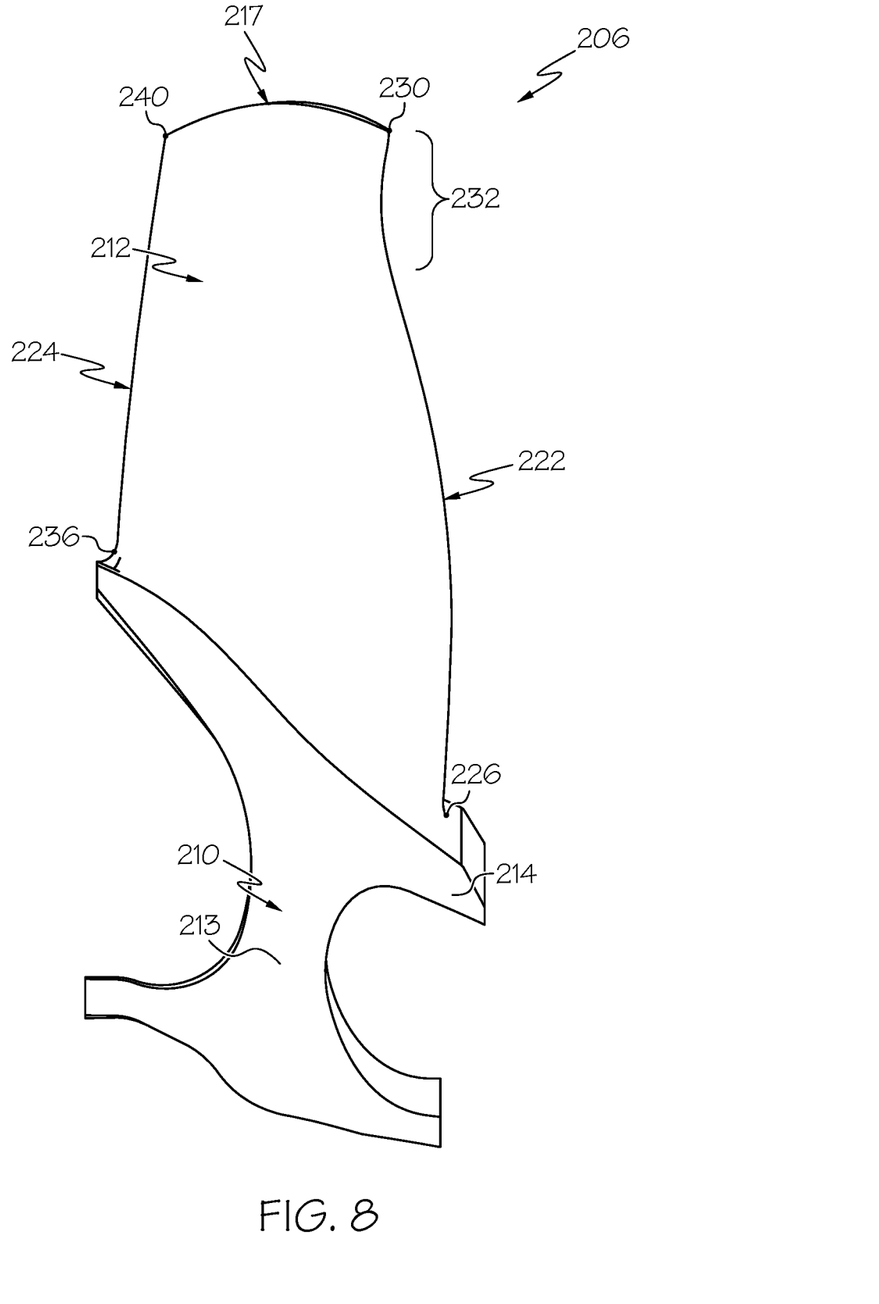
FIG. 8 is a first side view of the rotor blade of FIG. 6.
Figure 9:
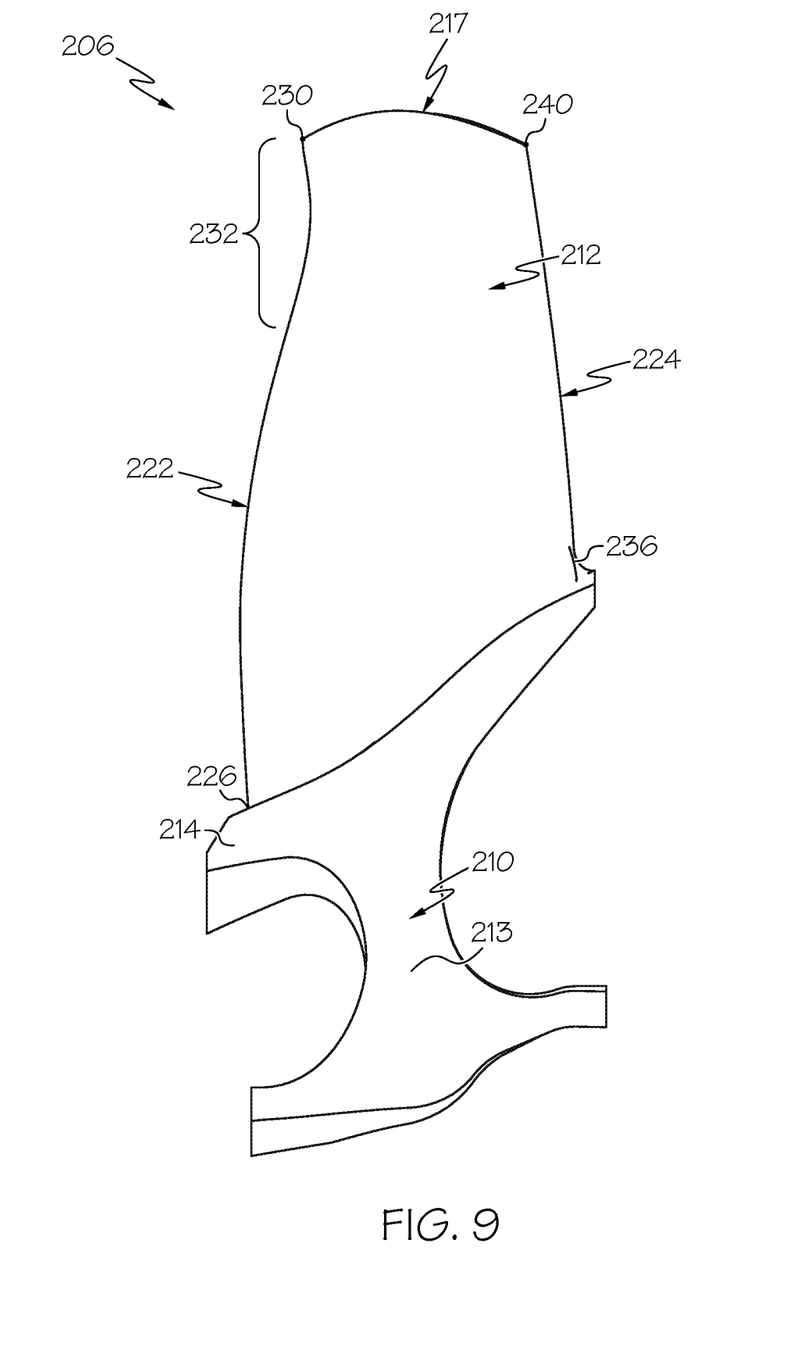
FIG. 9 is a second side view of the rotor blade of FIG. 6.

The blade 212 may also include a first face 218 (FIG. 6) and a second face 220 (FIG. 7). The first face 218 and second face 220 may oppose each other and may cooperate to define an airfoil shape. The first face 218 may face generally upstream, and the second face 220 may face generally downstream. In a chordwise direction, the first face 218 and the second face 220 may be joined at a leading edge 222 and a trailing edge 224 of the blade 212. (As used herein, the term "chordwise" refers to a direction along the blade 212 from the leading edge 222 to the trailing edge 224 or from the trailing edge 224 to the leading edge 222.) The mean axis 123 (FIG. 4) may extend chordwise between the leading edge 222 and the trailing edge 224 at a substantially constant radial distance from the centerline axis 120 and may be substantially centered between the first face 218 and the second face 220.

The blade 212 may have complex, three-dimensional curvature. For example, the blade 212 may have a predetermined amount of blade lean angle, sweep, and other curvature. Points on the blade 212 may be expressed in terms of a cylindrical coordinate system in some embodiments. Specifically, a point on the blade 212 may be expressed as having a longitudinal coordinate (i.e., on the longitudinal axis 120), a radial coordinate (i.e., on the radial axis 121), and an angular coordinate (i.e., an angle with respect to the longitudinal axis 120).

The leading edge 222 may extend through various points, such as a hub point 226, an intermediate point 228, and a tip point 230. The hub point 226 may be proximate the platform 214, the tip point 230 may be proximate the blade tip 217, and the intermediate point 228 may be disposed between the hub point 226 and the tip point 230 on the leading edge 222.

Likewise, the trailing edge 224 may extend through various points, such as a hub point 236, an intermediate point 238, and a tip point 240. The hub point 236 may be proximate the platform 214, the tip point 240 may be proximate the blade tip 217, and the intermediate point 238 may be disposed between the hub point 236 and the tip point 240.

A tip edge 250 may extend along the blade tip 217 from the tip point 230 of the leading edge 222 and the tip point 240 of the trailing edge 224. The tip edge 250 may curve slightly and may have a tip chord length 252 measured chordwise along the tip edge 250 from tip point 230 to tip point 240 as indicated in FIG. 6.

As shown in FIGS. 6-9, the leading edge 222 may include an indent segment 232. Generally, the indent segment 232 may be an indent, void, cutaway, concavity, or other aperture on the leading edge 222. The indent segment 232 may be defined between the intermediate point 228 and the tip point 230 of the leading edge 222. The indent segment 232 may be concave such that a nadir point 234 (i.e., the deepest point of the indent segment 232) is defined. Accordingly, the nadir point 234 may be disposed closer to the trailing edge 224 (in the chordwise direction) than the intermediate point 228 and the tip point 230.

An imaginary leading edge profile 254 is shown in phantom in FIG. 6 as well. The imaginary leading edge profile 254 extends continuously from the intermediate point 228 to the tip point 230 and represents what the leading edge 222 would look like with the indent segment 232 omitted. Accordingly, it will be appreciated that the imaginary leading edge profile 254 may extend substantially along the radial axis 121; however, the imaginary leading edge profile 254 may curve somewhat with respect to the radial axis 121. The indent segment 232 may be indented from the imaginary leading edge profile in a transverse direction relative to the radial axis 121.

More specifically, the indent segment 232 may have a depth 256. The depth 256 may be measured in the chordwise direction (i.e., along the mean axis 123) from the nadir point 234 to the imaginary leading edge profile 254. In some embodiments, the depth 256 may be measured along the mean axis 123 at a constant radial distance from the centerline axis 120. Also, the indent segment 232 may have an indent radial length 258, which is measured along the radial axis 121 from the intermediate point 228 to the tip point 230. Furthermore, the indent segment 232 may have an outer radial length 260, which is measured along the radial axis 121 from the nadir point 234 to the tip point 230. Also, the indent segment 232 may have an inner radial length 262, which is measured along the radial axis 121 from the intermediate point 228 to the nadir point 234.

The indent segment 232 may be disposed in an area that is likely to be impacted by foreign objects, such as ice, during operation (e.g., on the leading edge 222, proximate the blade tip 217). The dimensions, shape, and location of the indent segment 232 may cause the blade 212 to be more robust for withstanding the impact. Specifically, the blade 212 may elastically deform to some degree; however, the indent segment 232 may have a high resistance to plastic deformation due to the indent segment 232.

Generally, the indent segment 232 may be elongated in the radial direction and may be disposed closer to the blade tip 217 than the mount 210. Also, the depth 256 of the indent segment 232 may be significantly less than its length 258. Furthermore, the inner radial length 262 may be greater than the outer radial length 260. Accordingly, the indent segment 232 may increase stiffness and/or resistance to plastic deformation by distributing impact forces through the blade 212 in a relatively even manner.

In some embodiments, a first ratio of the indent radial length 258 to the leading edge radial length 221 may be at most 0.5. More specifically, the first ratio may be between approximately 0.2 and 0.45.

A second ratio of the indent depth 256 to the indent radial length 258 may be at least 0.05. More specifically, the second ratio may be approximately 0.1 and 0.2.

A third ratio of the indent depth 256 to the outer radial length 260 may be at least 0.1. More specifically, the third ratio may be between at least 0.15 and 0.45.

Additionally, a fourth ratio of the indent depth 256 to the inner radial length 262 may be at least 0.1. More specifically, the fourth ratio may be between at least 0.15 and 0.45.

Furthermore, a fifth ratio of the outer radial length 260 to the inner radial length 262 may be between 0.2 and 1.8. More specifically, the fifth ratio may be between approximately 0.5 and 1.5.

Also, a sixth ratio of the indent depth 256 to the tip chord length 252 may be greater than approximately one percent (1%). More specifically, the sixth ratio may be between approximately three percent (3%) and ten percent (10%).

These dimensional relationships may provide the blade 212 with increased robustness and resistance to plastic deformation. In addition, the indent segment 232 may provide some degree of weight savings in some embodiments.

The blade 212 may be manufactured using conventional tools and methods. For example, the blade 212 may be formed at least partially using a known casting process. Accordingly, the indent segment 232 as well as other features discussed above may be formed in an accurate fashion.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor blade for a gas turbine engine, the rotor blade configured to be mounted to a support structure for rotation about an axis of rotation, the rotor blade comprising:
    a mount configured to be attached to the support structure; and
    a blade that extends from the mount along a radial axis and that terminates at a blade tip, the blade including an actual leading edge and a trailing edge, the actual leading edge having a first point proximate the mount, a second point proximate the blade tip, and a third point disposed between the first point and the second point relative to the radial axis;
    wherein the actual leading edge includes an indent segment that extends between the second point and the third point, the indent segment including a nadir point;
    wherein the blade defines an imaginary leading edge that is coincident with the actual leading edge between the first point and the third point, that is coincident with the actual leading edge at the second point, and that is diverged from the indent segment of the actual leading edge between the second point and the third point, the imaginary leading edge including an imaginary leading edge profile extending continuously from the first point to the second point substantially along the radial axis;
    wherein the indent segment is indented from the imaginary leading edge profile in a transverse direction relative to the radial axis;
    wherein the actual leading edge has a leading edge radial length measured along the radial axis from the first point to the second point;
    wherein the indent segment has an indent radial length measured along the radial axis from the second point to the third point;
    wherein the indent segment has an indent depth measured from the nadir point to the imaginary leading edge profile along the transverse direction;
    wherein a first ratio of the indent radial length to the leading edge radial length is at most 0.5;
    wherein a second ratio of the indent depth to the indent radial length is at least 0.05;
    wherein the blade tip has a chord length measured from the actual leading edge to the trailing edge along the transverse direction; and
    wherein a sixth ratio of the indent depth to the chord length is between three percent (3%) and ten percent (10%).

2. The rotor blade of claim 1, wherein the indent segment has an outer radial length measured from the second point to the nadir point along the radial axis; and
    wherein a third ratio of the indent depth to the outer radial length is at least 0.1.

3. The rotor blade of claim 2, wherein the third ratio is between at least 0.15 and 0.45.

4. The rotor blade of claim 1, wherein the indent segment has an inner radial length measured from the third point to the nadir point along the radial axis; and
wherein a fourth ratio of the indent depth to the inner radial length is at least 0.1.

5. The rotor blade of claim 4, wherein the fourth ratio is between at least 0.15 and 0.45.

6. The rotor blade of claim 1, wherein the indent segment has an outer radial length measured from the second point to the nadir point along the radial axis;
wherein the indent segment has an inner radial length measured from the third point to the nadir point along the radial axis; and
wherein a fifth ratio of the outer radial length to the inner radial length is between 0.2 and 1.8.

7. The rotor blade of claim 6, wherein the fifth ratio is between approximately 0.5 and 1.5.

8. The rotor blade of claim 1, wherein the first ratio is between 0.20 and 0.45.

9. The rotor blade of claim 1, wherein the blade includes a mean axis extending between the actual leading edge and the trailing edge, and wherein the indent depth is measured along the mean axis.

10. A method of manufacturing a rotor blade for a gas turbine engine, the rotor blade configured to be mounted to a support structure for rotation about an axis of rotation, the method comprising:
forming a mount configured to be attached to the support structure; and
forming a blade that extends from the mount along a radial axis and that terminates at a blade tip, wherein forming the blade includes forming an actual leading edge and a trailing edge, the actual leading edge having a first point proximate the mount, a second point proximate the blade tip, and a third point disposed between the first point and the second point relative to the radial axis;
wherein the actual leading edge includes an indent segment that extends between the second point and the third point, the indent segment including a nadir point;
wherein forming the blade includes defining an imaginary leading edge that is coincident with the actual leading edge between the first point and the third point, that is coincident with the actual leading edge at the second point, and that is diverged from the indent segment of the actual leading edge between the second point and the third point, the imaginary leading edge including an imaginary leading edge profile extending continuously from the first point to the second point substantially along the radial axis;
wherein the indent segment is indented from the imaginary leading edge profile in a transverse direction relative to the radial axis;
wherein the actual leading edge has a leading edge radial length measured along the radial axis from the first point to the second point;
wherein the indent segment has an indent radial length measured along the radial axis from the second point to the third point;
wherein the indent segment has an indent depth measured from the nadir point to the imaginary leading edge profile along the transverse direction;
wherein a first ratio of the indent radial length to the leading edge radial length is at most 0.5;
wherein a second ratio of the indent depth to the indent radial length is at least 0.05;
wherein the blade tip has a chord length measured from the leading edge to the trailing edge along the transverse direction; and
wherein a sixth ratio of the indent depth to the chord length is between three percent (3%) and ten percent (10%).

11. The method of claim 10, wherein forming the blade includes forming the indent segment to have an outer radial length measured from the second point to the nadir point along the radial axis; and
wherein a third ratio of the indent depth to the outer radial length is at least 0.1.

12. The method of claim 10, wherein forming the blade includes forming the indent segment to have an inner radial length measured from the third point to the nadir point along the radial axis; and
wherein a fourth ratio of the indent depth to the inner radial length is at least 0.1.

13. The method of claim 10, wherein forming the blade includes forming the indent segment to have an outer radial length measured from the second point to the nadir point along the radial axis;
wherein the indent segment has an inner radial length measured from the third point to the nadir point along the radial axis; and
wherein a fifth ratio of the outer radial length to the inner radial length is between 0.2 and 1.8.

14. The method of claim 10, wherein the first ratio is between 0.20 and 0.45.

15. A rotor for a compressor of a gas turbine engine comprising:
a rotor disc configured to rotate about an axis of rotation; and
a plurality of rotor blades that are attached to the rotor disc, at least one of the plurality of rotor blades including a mount that is attached to the rotor disc and a blade, the blade extending from the mount along a radial axis and terminating at a blade tip, the blade including an actual leading edge and a trailing edge, the blade tip extending between the actual leading edge and the trailing edge;
wherein the blade includes a mean axis extending between the leading edge and the trailing edge;
wherein the actual leading edge includes a hub point proximate the mount, a tip point proximate the blade tip, and an intermediate point disposed between the hub point and the tip point relative to the radial axis;
wherein the actual leading edge includes a solitary indent segment that extends between the tip point and the intermediate point, the indent segment including a nadir point;
wherein the blade defines an imaginary leading edge that is coincident with the actual leading edge between the hub point and the intermediate point, that is coincident with the actual leading edge at the tip point, and that is diverged from the indent segment of the actual leading edge between the tip point and the intermediate point, the imaginary leading edge including an imaginary leading edge profile extending continuously from the hub point to the tip point substantially along the radial axis;
wherein the indent segment is indented from the imaginary leading edge profile with respect to the mean axis;

wherein the actual leading edge has a leading edge radial length measured along the radial axis from the hub point to the tip point;

wherein the indent segment has an indent radial length measured along the radial axis from the tip point to the intermediate point;

wherein the indent segment has an indent depth measured from the nadir point to the imaginary leading edge profile along the mean axis;

wherein a first ratio of the indent radial length to the leading edge radial length is between 0.20 and 0.45;

wherein a second ratio of the indent depth to the indent radial length is between 0.1 and 0.2;

wherein the blade tip has a chord length measured from the leading edge to the trailing edge along the transverse direction; and wherein a sixth ratio of the indent depth to the chord length is between three percent (3%) and ten percent (10%).

* * * * *